United States Patent [19]

Tomita et al.

[11] Patent Number: 5,033,806

[45] Date of Patent: Jul. 23, 1991

[54] OPTICAL SCANNER

[75] Inventors: Kan Tomita, Tokyo; Takashi Shibaguchi, Yokohama, both of Japan

[73] Assignee: Ricoh Company, Ltd., Tokyo, Japan

[21] Appl. No.: 517,736

[22] Filed: May 2, 1990

[30] Foreign Application Priority Data

May 9, 1989 [JP] Japan .................................. 1-115778

[51] Int. Cl.$^5$ ............................................. G02B 26/10
[52] U.S. Cl. ........................ 350/6.7; 350/6.1; 350/6.8; 250/201.1; 250/234; 346/1.1
[58] Field of Search ................... 350/6.1, 6.5, 6.6, 6.7, 350/6.8, 6.9, 6.91, 356; 250/201.1, 234, 235, 236; 358/225, 227, 471, 494; 346/1.1, 108

[56] References Cited

U.S. PATENT DOCUMENTS

| | | | |
|---|---|---|---|
| 4,316,196 | 2/1982 | Jacobs | 346/1.1 |
| 4,420,772 | 12/1983 | Jacobs | 350/356 |
| 4,455,485 | 6/1984 | Hosake et al. | 250/234 |
| 4,733,064 | 3/1988 | Ishikawa | 350/6.8 |

Primary Examiner—Bruce Y. Arnold
Assistant Examiner—Loha Ben

Attorney, Agent, or Firm—Oblon, Spivak, McClelland, Maier & Neustadt

[57] ABSTRACT

An optical scanner has a light source device for emitting an approximately parallel light beam polarized approximately linearly; a deflector for deflecting the light beam from this light source device toward a scanned face; an image forming optical system including an optical element having a focal length variable by an electrooptic medium, the image forming optical system being arranged between the light source device and the deflector to form the light beam from the light source device as an image in the shape of a spot on the scanned face; a controller for controlling the focal length of the image forming optical system; and an electrode pair disposed in the electrooptic medium of the optical element, the arrangement position and shape of the respective electrodes being constructed such that a convergent position of the emitted light can be changed when a voltage is applied by the controller between these electrodes; the controller controlling the focal length of the image forming optical system such that field curvature is removed in synchronization with an optical scanning operation, or the diameter of the formed image spot is approximately constant irrespective of the optical scanning position. Another optical scanner is also shown.

9 Claims, 6 Drawing Sheets

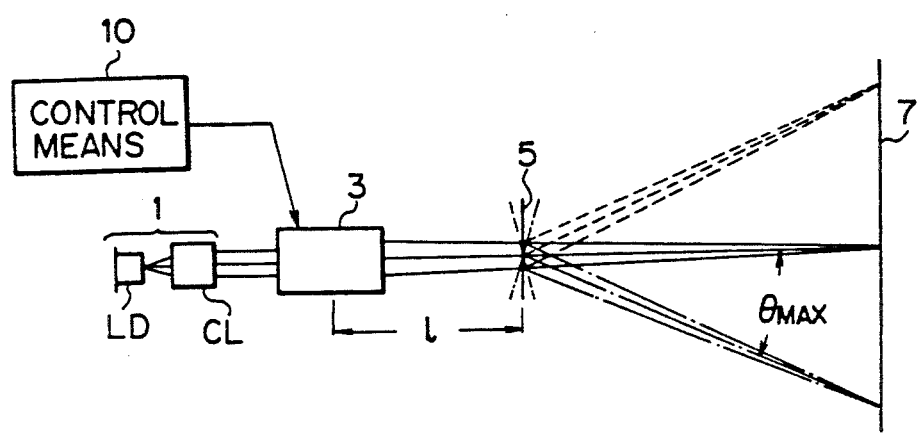
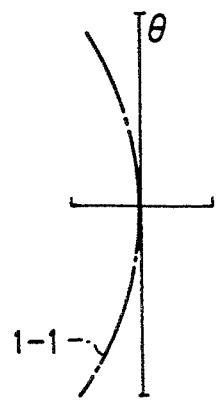
Fig. 1a
Fig. 1c
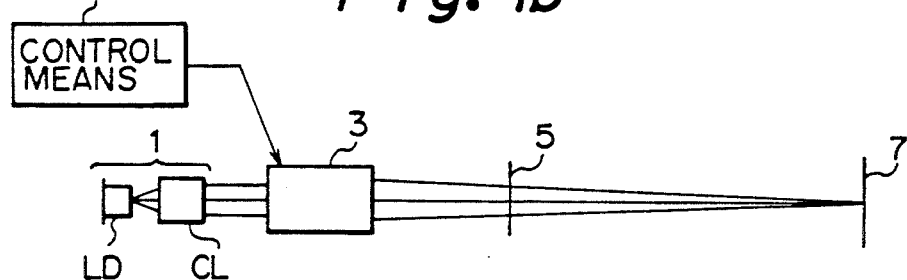
Fig. 1b
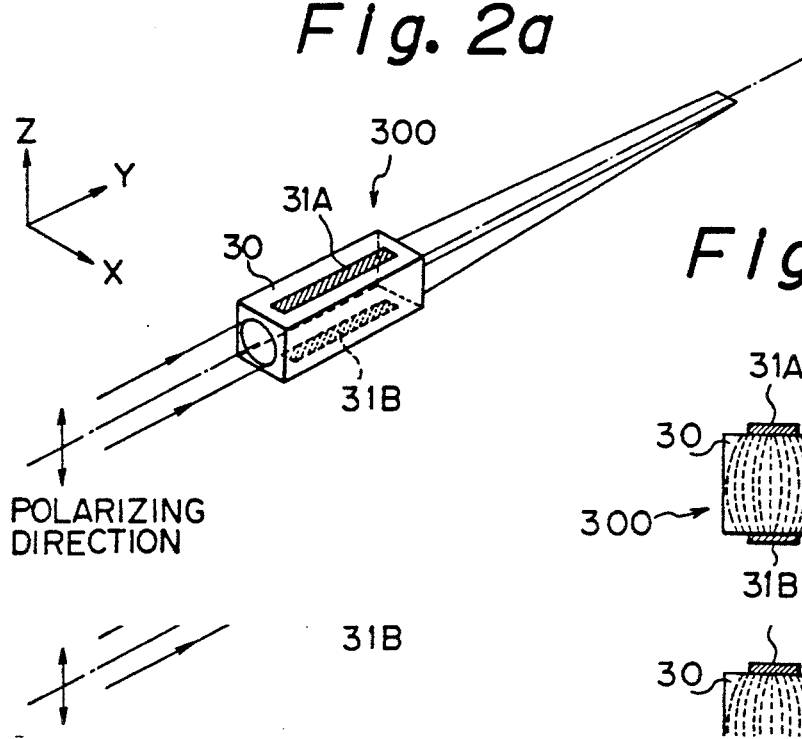
Fig. 2a
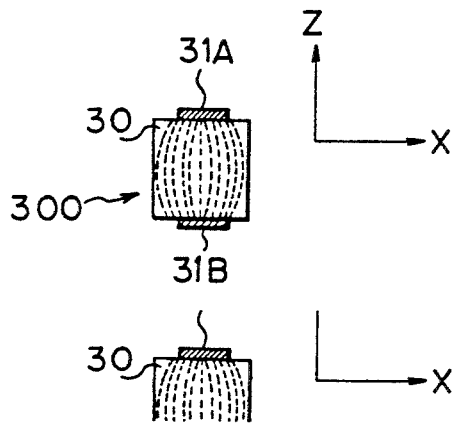
Fig. 2b

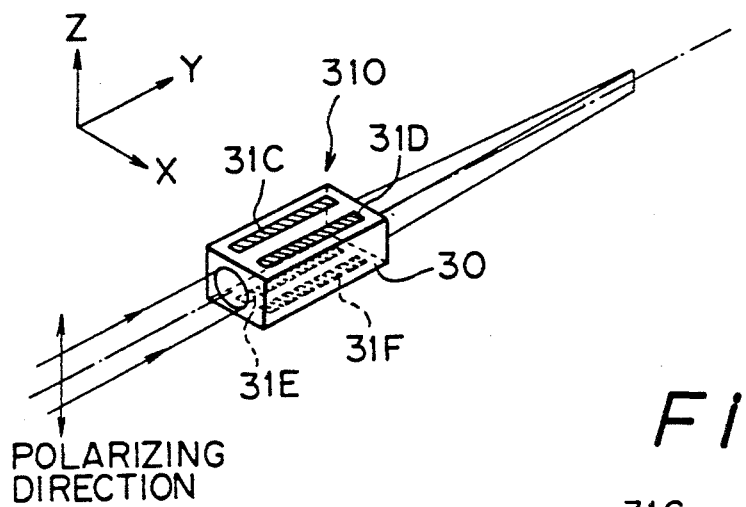
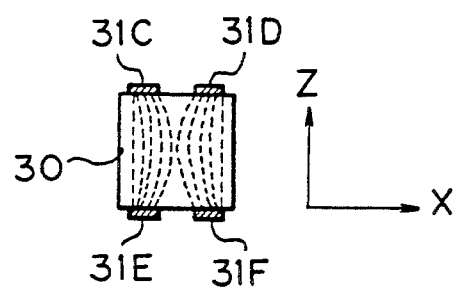
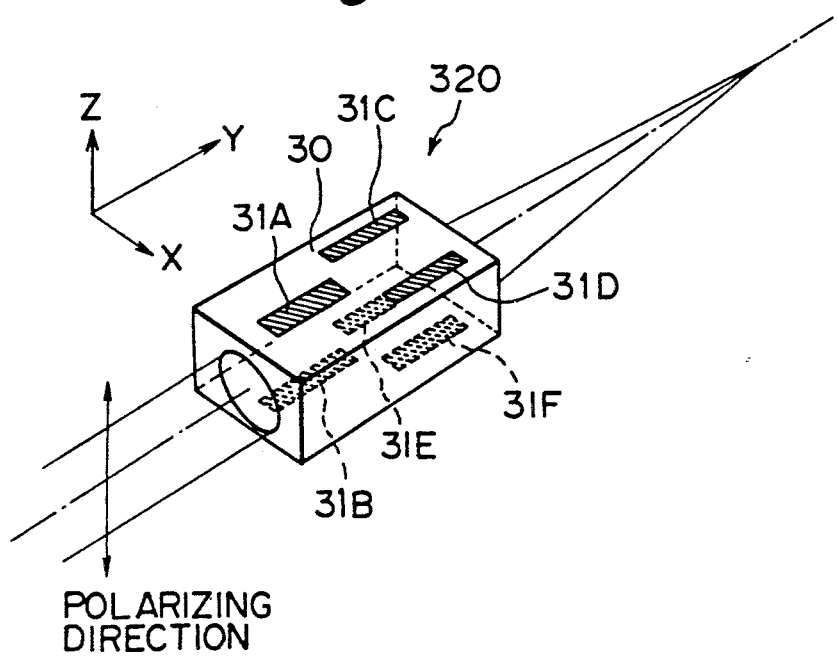

(MAIN SCAN—CORRESPONDING DIRECTION)

(CROSS SCAN—CORRESPONDING DIRECTION)

(MAIN SCAN-CORRESPONDING DIRECTION)

(CROSS SCAN-CORRESPONDING DIRECTION)

OPTICAL SCANNER

BACKGROUND OF THE INVENTION

1. Field of the Invention

The present invention relates to an optical scanner using a light source device.

2. Description of the Related Art

An optical scanner is a device for writing information by a scanning operation of a light beam and is well known in association with a laser printer, a digital copying machine, a laser engraving device, etc.

To preferably write information by the optical scanner, it is important to stabilize the diameter of a spot of an image formed on a face scanned by the light beam in a main scanning region. In particular, to perform an optical scanning operation of high density, it is very important to stabilize the diameter of the formed image spot.

Recently, an image forming optical system arranged between a light source device and a means for deflecting a light beam has been proposed to stabilize the diameter of the formed image spot. In this case, the image forming optical system or a light source is mechanically displaced in the direction of an optical axis. However, responsive speed is limited in such a mechanical displacement and it is difficult to perform the optical scanning operation at a high speed.

SUMMARY OF THE INVENTION

It is therefore an object of the present invention to provide a novel optical scanner for stabilizing a formed image spot without any mechanical displacement of a light source or an image forming optical system.

In a first embodiment of the present invention, the above object of the present invention can be achieved by an optical scanner comprising a light source device for emitting an approximately parallel light beam polarized approximately linearly; deflecting means for deflecting the light beam from this light source device toward a scanned face; an image forming optical system including an optical element having a focal length variable by an electrooptic medium, the image forming optical system being arranged between the light source device and the deflecting means to form the light beam from the light source device as an image in the shape of a spot on the scanned face; control means for controlling the focal length of the image forming optical system; and an electrode pair disposed in the electrooptic medium of the optical element, the arrangement position and shape of the respective electrodes being constructed such that a convergent position of the emitted light can be changed when a voltage is applied by the control means between these electrodes; the control means controlling the focal length of the image forming optical system such that field curvature is removed in synchronization with an optical scanning operation, or the diameter of the formed image spot is approximately constant irrespective of the optical scanning position.

In a second embodiment of the present invention, the above object of the present invention can be achieved by an optical scanner comprising a light source device for emitting an approximately parallel light beam polarized approximately linearly; deflecting means for deflecting the light beam from this light source device toward a scanned face; a first image forming optical system including an optical element having a focal length variable by an electrooptic medium and arranged between the light source device and the deflecting means; a second image forming optical system arranged between the deflecting means and the scanned face and forming the light beam deflected by the deflecting means as an image on the scanned face; control means for controlling the focal length of the first image forming optical system; and an electrode pair disposed in the electrooptic medium of the optical element, the arrangement position and shape of the respective electrodes being constructed such that the focal position of the light beam in at least one of two directions perpendicular to each other can be changed when a voltage is applied by the control means between these electrodes; the control means controlling the focal length of the first image forming optical system such that field curvature in a main scanning direction and/or a cross scanning direction is removed in synchronization with an optical scanning operation, or the diameter of the formed image spot is approximately constant irrespective of the optical scanning position.

In the above first and second optical scanners, an optical system for expanding the light beam is disposed between the optical element and the deflecting means.

Further objects and advantages of the present invention will be apparent from the following description of the preferred embodiments of the present invention as illustrated in the accompanying drawings.

BRIEF DESCRIPTION OF THE DRAWINGS

FIGS. 1a to 1c are views for explaining an optical scanner in a first embodiment of the present invention;

FIGS. 2a to 2e are views for explaining an optical element;

DESCRIPTION OF THE PREFERRED EMBODIMENTS

Figure 3:
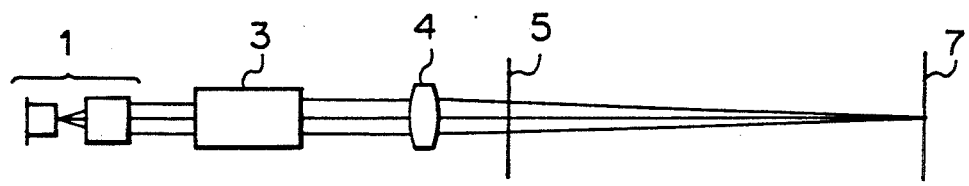
FIG. 3 is a view for explaining an optical scanner in a second embodiment of the present invention.

The preferred embodiments of an optical scanner in the present invention will next be described in detail with reference to the accompanying drawings.

In the present invention, an optical scanner has a light source device, a deflecting means, an image forming optical system and a control means.

The light source device emits an approximately parallel light beam polarized approximately linearly.

The deflecting means deflects the light beam from the light source device toward a scanned face.

The image forming optical system includes an optical element having a focal length variable by an electrooptic medium. The image forming optical system is arranged between the light source device and the deflecting means to form the light beam from the light source device as an image in the shape of a spot on the scanned face. The image forming optical system can be constructed by only the optical element or a combination of the optical element and a lens.

The control means controls the focal length of the image forming optical system.

In the optical element in the image forming optical system, an electrode pair is disposed in the electrooptic medium and the arrangement position and shape of the respective electrodes are constructed such that a convergent position of the emitted light can be changed when a voltage is applied by the control means between these electrodes.

The control means controls the focal length of the image forming optical system such that field curvature is removed in synchronization with an optical scanning operation, or the diameter of the formed image spot is approximately constant irrespective of the optical scanning position.

A second optical scanner of the present invention has the same light source device and deflecting means as those in the above first optical scanner and further has first and second image forming optical systems and a control means.

The first image forming optical system includes an optical element having a focal length variable by an electrooptic medium and is arranged between the light source device and the deflecting means. This first image forming optical system can be constructed by only the optical element or a combination of the optical element and a lens.

The second image forming optical system is arranged between the deflecting means and the scanned face and forms the light beam deflected by the deflecting means as an image on the scanned face.

The control means controls the focal length of the first image forming optical system.

In the optical element in the above first image forming optical system, an electrode pair is disposed in the electrooptic medium and the arrangement position and shape of the respective electrodes are constructed such that the focal position of the first image forming optical system in at least one of two directions perpendicular to each other can be changed when a voltage is applied by the control means between these electrodes.

"The focal position of the first image forming optical system in at least one of two directions perpendicular to each other" means at least one of convergent positions in which the light emitted from the optical element is converged in the above two directions.

The control means controls the focal length of the first image forming optical system such that field curvature in a main scanning direction and/or a cross scanning direction is removed in synchronization with an optical scanning operation, or the diameter of the formed image spot is approximately constant irrespective of the optical scanning position.

In a third optical scanner, an optical system for expanding the light beam is disposed between the optical element and the deflecting means in addition to the construction of each of the first and second optical scanners. When the image forming optical system on the side of the light source device or the first image forming optical system is constructed by a combination of the optical element and a lens, the beam expanding optical system is arranged between the above lens and a deflection-reflecting face, or between the optical element and the lens.

In the first to third optical scanners, the deflecting means can be constructed by a rotary polygon mirror, a galvanomirror or a pyramidal mirror.

In the second optical scanner, the second image forming optical system can be constructed by an f θ lens or a normal image forming lens.

As mentioned above, the optical element is used in the above-mentioned first to third optical scanners, which is one feature of the present invention.

Such an optical element is proposed by the applicant of this application in Japanese Patent Application No. 63-56766. Any one of optical elements having various kinds of modifications shown in the specification of this Patent Application can be suitably used in the present invention. However, here, three kinds of optical elements directed used in the embodiments of the present invention described later will be briefly described.

In FIG. 2a, an optical element 300 is constructed by attaching a pair of electrodes 31A, 31B to an electrooptic medium 30. The electrooptic medium is constructed by a substance having a refractive index changed in accordance with an electric field strength when an electric field is applied to this electrooptic medium. As is well known, this electrooptic medium is made of various kinds of materials such as PLZT electrooptic crystal, etc. Here, to make the following description concrete, the electrooptic medium 30 is assumed to be constructed by PLZT (9/65/35) electrooptic crystal. The electrooptic medium 30 is formed in the shape of a rectangle and a light beam is transmitted through the electrooptic medium in Y direction.

The electrodes 31A, 31B have a rectangular shape extending in the Y direction and overlap each other when these electrodes are seen from Z direction. When an electric field is applied to the electrooptic medium 30, the refractive index of the electrooptic medium 30 is reduced by an electrooptic effect in a portion thereof to which the electric field is applied.

In the following description, when no electric field is applied to the electrooptic medium, the refractive index of this electrooptic medium is set to $N_O$. A matrix component of a secondary electrooptic coefficient is set to $R_{33}$. In this case, refractive index $N_z$ is provided by the following formula $$N_z = N_o \{1 - (\tfrac{1}{2}) N_o^2 R_{33} E_z^3 \}$$

in a portion of the electrooptic medium to which an electric field component $E_z$ in the Z direction is applied. Namely, the refractive index is reduced in proportion to the second power of the electric field in the portion of the electrooptic medium to which the electric field is applied.

FIG. 2b shows a state in which a voltage is applied between the electrodes 31A and 31B to act the electric field onto the electrooptic medium 30. A distribution with respect to an electric line of force as shown in FIG. 2b is caused in the electrooptic medium 30 by the above application of voltage. The density of the electric line of force is proportional to the electric field strength. Accordingly, in the state shown in FIG. 2b, the refractive index is reduced as the electric line of force approaches the electrodes 31A and 31B. The refractive index is not reduced so much in a central portion of the electrooptic medium 30 with respect to the Z direction. Accordingly, in the state in which the electric field is applied to the electrooptic medium, the optical element 300 acts on the light beam (polarized in the Z direction) transmitted in the Y direction as if this optical element functions as a cylindrical lens having refracting power only in the Z direction. Accordingly, as shown in FIG. 2a, when the voltage is applied between the electrodes 31A and 31B while the light beam polarized in the Z direction is transmitted through the electrooptic medium in the Y direction, it is possible to converge the transmitted light beam in the Z direction. The convergent position of the light beam can be displaced in the Y direction by changing the applied voltage.

An optical element 310 shown in FIG. 2c has four electrodes 31C, 31D, 31E and 31F having a rectangular shape on two faces of an electrooptic medium 30 perpendicular to the Z direction and arranged in parallel to each other in the Y direction. When these electrodes are seen from the Z direction, the electrodes 31C, 31E and the electrodes 31D, 31F respectively overlap each other, thereby constituting electrode pairs.

When a voltage is applied to the optical element 310, the electrodes 31C and 31D have potentials of the same polarity and the electrodes 31E and 31F have potentials of a polarity reverse to the polarity of the electrodes 31C and 31D. Accordingly, a distribution with respect to an electric line of force as shown in FIG. 2d is provided in the state in which the voltage is applied to the optical element 310. The optical element 310 acts on the light beam (polarized in the Z direction) transmitted in the Y direction as if this optical element functions as a cylindrical lens having refracting power only in the X direction. Accordingly, as shown in FIG. 2c, when the voltage is applied to the optical element 310 while the parallel light beam polarized in the Z direction is transmitted through this optical element in the Y direction, the transmitted light beam is converged in the X direction. The convergent position of the light beam in the X direction can be displaced in the Y direction by changing the applied voltage.

An optical element 320 shown in FIG. 2e has a pair of electrodes 31A, 31B as shown in FIG. 2a and electrode pairs 31C, 31D, 31E and 31F as shown in FIG. 2c. The electrodes 31A, 31B and the electrodes pairs 31C to 31F are arranged in an electrooptic medium 30 as shown in FIG. 2e. When a parallel light beam polarized in the Z direction is transmitted through the optical element 320 in the Y direction while a voltage is applied between these electrodes, the transmitted light is first converged in the Z direction by an action equal to that of a cylindrical lens having refracting power in the Z direction with respect to a first half of the optical element 320. In the latter half of the optical element 320, the transmitted light is converged in the X direction by an action equal to that of a cylindrical lens having refracting power in the X direction. Accordingly, it is possible to converge the transmitted light beam at one point by adjusting the convergent state of the light beam. Thus, it is possible to displace the convergent position of the light beam in the Y direction by adjusting the applied voltage.

When the voltage applied to the electrode pair 31A, 31B and the voltage applied to the electrodes pairs 31C to 31F are independently controlled, it is possible to independently displace the convergent positions of the light beam in the Z and X directions.

In the present invention, the image spot formed on the scanned face is stabilized by using such a function for displacing the convergent position of the light beam in the optical element.

The concrete embodiments of the present invention will next be described.

FIGS. 1a to 1c show an optical scanner in a first embodiment of the present invention. In these figures, a light source device 1 is constructed by a combination of a semiconductor laser LD and a collimator lens CL and emits an approximately parallel light beam.

An optical element 3 is constructed by the optical element as explained in FIG. 2e. Reference numeral 5 designates a deflection-reflecting face of a deflecting means. This deflecting means is assumed to be constructed by a rotary polygon mirror in this embodiment and the other embodiments of the present invention described later. FIG. 1a develops an optical arrangement from the light source device 1 to a scanned face 7 along an optical path. In FIG. 1a, a main scanning direction is a vertical direction.

Similarly, FIG. 1b develops an optical arrangement from the light source device 1 to the scanned face 7 along an optical path. In FIG. 1b, a cross scanning direction is the vertical direction.

A polarizing direction of light emitted from the semiconductor laser LD as a light source corresponds to the cross scanning direction. Accordingly, the applied direction of an electric field in the optical element 3 also corresponds to the cross scanning direction.

The optical element 3 can converge the emitted light beam at one point by applying a voltage between electrodes in a state in which the parallel light beam polarized in a cross scan-corresponding direction is emitted from the light source device 1 to the optical element 3. Thus, it is possible to displace the convergent position of the emitted light beam by adjusting this voltage.

Namely, the optical element 3 has the same refracting power in the main and cross scanning directions and this power can be changed by controlling the applied voltage.

The applied voltage is controlled by the operation of a control means 10 such as a microcomputer, etc.

As shown in FIG. 1a, it is assumed that the voltage applied to the optical element 3 is adjusted and the light beam converged by the optical element 3 is formed as an image in the shape of a spot in a central portion of a main scanning region on the scanned face. In this state, when the light beam is deflected by the deflecting means, an arc trace 1-1 as shown in FIG. 1c is formed by the formed image point of the light beam and therefore forms field curvature. When there is such field curvature, the diameter of the image spot formed on the scanned face 7 is increased in both the main and cross scanning directions as a deflection angle $\theta$ is increased.

When the focal length of the optical element 3 in the above state is set to $f_0$ and the distance between the deflection-reflecting face 5 and the optical element 3 is set to 1, the above field curvature is represented by $$(f_0 - 1)\{(1/\cos \theta) - 1\}$$

as a function of the deflection angle $\theta$ of the light beam. An angle of the light beam incident on the optical element 3 is fixed to zero so that the above field curvature is common with respect to the main and cross scanning directions.

Therefore, when the voltage applied to the optical element 3 is adjusted to change the focal length of the optical element 3 such that the formed image point is located on the scanned face 7 at any time irrespective of the deflection angle $\theta$, it is sufficient to change the focal length $f(\theta)$ together with the deflection angle $\theta$ so as to satisfy the following formula (1).

$$f(\theta)=(f_0-1)(1/\cos\theta)+1 \qquad (1)$$

When this change in focal length is determined, the relation $V(\theta)$ between the deflection angle $\theta$ and the voltage V to be applied to the optical element 3 is determined in accordance with the determination of the change in focal distance.

The deflection angle $\theta$ in the optical scanning operation is determined in association with a synchronization clock signal for synchronization of the optical scanning operation. Therefore, the field curvature 1-1 can be completely removed if the above voltage $V(\theta)$ corresponding to the synchronization clock signal is stored to a memory section of the control means 10 and is applied to the optical element 3 by the operation of the control means 10 in accordance with the synchronization clock signal.

Thus, the diameter of the formed image spot for optically scanning the scanned face 7 is effectively stabilized. However, the diameter of the formed image spot cannot be completely uniformed for the following reasons even when the field curvature is completely corrected.

Namely, the diameter of the formed image spot is determined as a waist diameter of the converged laser beam. When the beam waist radius is set to $\omega$, this radius has the following relation with respect to a wavelength $\lambda$ and $F_{NO}$ of an image forming optical system.

$$F_{NO}=\pi\omega/(2\lambda)$$

In the above-mentioned method, the focal length of the optical element 3 constituting the image forming optical system is changed so that the $F_{NO}$ is changed together with the deflection angle $\theta$ and the beam waist diameter is correspondingly changed.

The change in diameter of the formed image spot caused by this change in beam waist diameter will be concretely considered as follows.

When a maximum value of the deflection angle is set as $\theta_{MAX}=30°$ and the distance 1 is set to $0.1f_0$, the diameter of the formed image spot in both end portions of the main scanning region is 1.14 times that in the central portion of the main scanning region in the state in which the field curvature is removed as mentioned above. An allowable range of the change in diameter of the formed image spot is set to about $\pm 10\%$ with respect to a predetermined spot diameter. Accordingly, in this case, the change in spot diameter is considered to be $\pm 7\%$ and is therefore within a range allowed practically and sufficiently.

It is possible to make the beam waist diameter constant on the scanned face 7 instead of the removal of the field curvature. In this case, the diameter of the formed image spot can be uniformed in the entire main scanning region.

To do this, it is sufficient to control the voltage applied to the optical element 3 such that the focal length $f(\theta)$ of the optical element 3 with respect to the deflection angle $\theta$ satisfies the following relation (2).

$$f_{MAX} = [\omega_0^2 \cdot f(\theta)\{(\cos\theta_{MAX})/(\cos\theta)\} \pm \{\lambda/(\pi\omega_0)\} \cdot f(\theta)^2 \cdot \sqrt{\omega_0^2 - \omega_0^2\{(\cos\theta_{MAX})/(\cos\theta)\}^2 + \{\lambda/(\pi\omega_0)\}^2 \cdot \{f(\theta)\}^2]/[\omega_0^2\{(\cos\theta_{MAX})/(\cos\theta)\}^2 - \{\lambda/(\pi\omega_0)\}^2 \cdot \{f(\theta)\}^2] \qquad (2)$$

In the above formula (2), $\omega_0$ designates a radius of the formed image spot when the deflection angle $\theta=0$, $\lambda$ a wavelength of the light beam, $\theta_{MAX}$ a maximum deflection angle corresponding to an end portion of the main scanning region, and $f_{MAX}$ designates a focal distance of the optical element at the deflection angle $\theta_{MAX}$.

The applied voltage may be controlled such that the above formula (1) or (2) is approximately satisfied instead of the control of the voltage applied to the optical element 3 so as to accurately satisfy the formula (1) or (2).

One problem in use of the optical element 3 is that it is necessary to apply a strong electric field about several hundred V/mm to the optical element so as to realize a relatively short focal length thereof so that the optical scanner is large-sized to control the operation thereof at a relatively low voltage. To avoid such a problem, as in a second embodiment of the present invention in FIG. 3, a convergent lens 4 as a spherical lens is disposed between an optical element 3 and a deflecting means so as to reduce the distance from an image forming optical system to the convergent position of a light beam.

In FIG. 3 drawn in accordance with FIG. 1b, the vertical direction corresponds to a cross scanning direction and a control means is omitted.

In this second embodiment, the image forming optical system is constructed by the optical element 3 and the convergent lens 4.

When the focal length of the optical element 3 is set to $f_1$ and the focal length of the convergent lens 4 is set to $f_2$ and the distance between main points of the optical element 3 and the convergent lens 4 is set to d, a combined focal length F of the image forming optical system is provided by the following formula.

$$(1/F)=(1/f_1)+(1/f_2)-\{d/(f_1\cdot f_2)\}$$

The voltage applied to the optical element 3 is controlled such that the above combined focal length F corresponds to the focal length $f(\theta)$ in the formula (1) or (2) and the focal length $f_1(\theta)$ providing the combined focal length $F(\theta)$ satisfying the formulas (1) and (2) is realized accurately or approximately. Thus, it is possible to perform the optical scanning operation without any change in diameter of the formed image spot or with an effectively reduced change in this diameter. The image forming optical system has the convergent lens and the combined focal length is short so that a region for changing the voltage applied to the optical element may be small.

For example, in the case of the first embodiment in FIGS. 1a to 1c, when the deflection angle $\theta=0$, the focal length $f(\theta=0)=220$ mm and the distance $l=20$ mm. When the deflection angle $\theta_{MAX}=30°$, the focal length $f(\theta=30°)=251$ mm and the electric field applied between the electrodes of the optical element 3 is 3 to $4\times10^2$ V/mm. In the embodiment shown in FIG. 3, when the focal length of the convergent lens 4 is set to 251 mm and the above distance d=10 mm, the focal length of the optical element 3 is provided as $f(\theta=0)=1710$ mm and $f(\theta=30°)=\infty$. Therefore, the applied electric field is reduced and ranged from $0(\theta=30°)$ to $2\times10^2$ V/mm.

FIGS. 4a to 4d show an optical scanner in a third embodiment of the present invention.

Figures 4A, 4C:
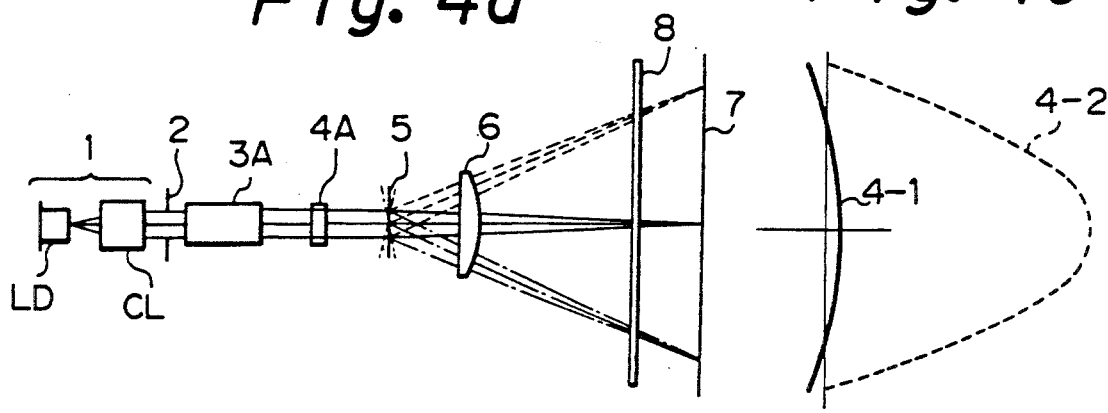
FIGS. 4a to 4d are views for explaining an optical scanner in a third embodiment of the present invention.
Figure 4B:
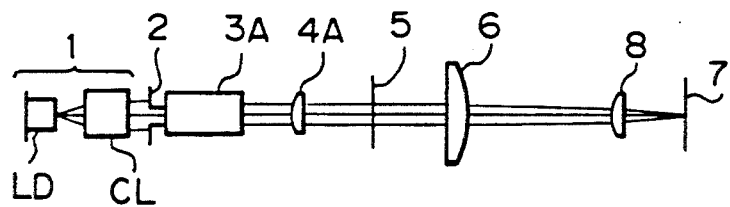

FIGS. 4a and 4b are drawn in accordance with FIGS. 1a and 1b. In FIG. 4a, the vertical direction corresponds to a main scanning direction. In FIG. 4b, the vertical direction corresponds to a cross scanning direction. In these figures, a control means is omitted.

In FIGS. 4a to 4d, portions similar to those in FIGS. 1a to 1c are designated by the same reference numerals.

A light beam polarized in a cross scan-corresponding direction is emitted from a semiconductor laser LD of a light source device 1. Accordingly, an approximately parallel light beam polarized in the cross scan-corresponding direction is emitted from the light source device 1. The cross-sectional shape of this light beam is next restricted by an aperture 2 for adjusting the shape of an image spot formed on a scanned face 7 and this light beam is incident to an optical element 3A. The light beam transmitted through the optical element 3A is incident to a cylindrical lens 4A having refracting power only in the cross scanning direction and is reflected on a deflection-reflecting face 5 through the cylindrical lens 4A. The reflected light beam is then formed as an image in the shape of a spot on the scanned face 7 by the actions of an f$\theta$ lens 6 and the cylindrical lens 8.

The optical element 3A is similar to that explained in FIGS. 2c and 2d and is arranged such that the Z direction corresponds to the cross scanning direction. Accordingly, the convergent position of the light beam in the main scanning direction can be adjusted by the adjustment of a voltage applied to the optical element 3A.

The optical element 3A and the cylindrical lens 4A constitute a first image forming optical system.

The f$\theta$ lens 6 and the cylindrical lens 8 constitute a second image forming optical system and set the positions of the deflection-reflecting face and the scanned face in an approximately conjugate relation in geometrical optics with respect to the cross scanning direction, thereby constituting an optical system for correcting a so-called face inclination.

When no voltage is applied to the optical element 3A, field curvature is provided as shown in FIG. 4c. Since field curvature 4-1 in the cross scanning direction is preferably corrected, there is particularly no problem about the change in diameter of the formed image spot caused by such field curvature. However, field curvature 4-2 in the main scanning direction is large so that this field curvature is corrected by adjusting the focal length of the optical element 3A in a main scan-corresponding direction. In this case, when the deflection angle $\theta$ is ranged from 0 to $\pm 20$ degrees, the focal length of the optical element is adjusted such that the focal length of the optical element 3A is set to be infinite at the deflection angle 20 degrees in both the main and cross scanning directions and is reduced in the main scan-corresponding direction as the deflection angle $\theta$ is reduced.

A concrete example with respect to each optical system in this embodiment will next be described.

When the deflection angle $\theta=0$, the focal length of the optical element 3A in the main scan-corresponding direction is provided as $f_M=9216$ and the focal distance of the optical element 3A in the cross scan-corresponding direction is provided as $f_S=\infty$. When the deflection angle $\theta=20$ degrees, formula $f_M=f_S=\infty$ is formed.

The radius of curvature of the cylindrical lens 4A is provided as $R_M=\infty$ with respect to the main scan-corresponding direction and is provided as $R_S=160$ with respect to the cross scanning direction. With respect to this cylindrical lens 4A, lens thickness is set to d=3, and the refractive index of a material forming this cylindrical lens is set to 1.51. Further, the distance between a main point of the optical element 3A and an object side face of the cylindrical lens 4A at the deflection angle $\theta$ is set to 10. The distance between the deflection-reflecting face 5 and a face of the cylindrical lens 4A on an image side thereof is set to 74.3.

With respect to the f$\theta$ lens 6 and the cylindrical lens 8, the distance on an optical axis between the above deflection-reflecting face and an object side face of the f$\theta$ lens 6 is set to $d_0$. Further, the radius of curvature on an i-th lens face from the side of the deflection-reflecting face 5 toward the scanned face 7 is set to $R_{iX}$ in the main scan-corresponding direction and is set to $R_{iY}$ in the cross scanning direction. Further, the distance between faces of the i-th lens is set to $d_i$. The refractive index of a j-th lens with respect to light having wavelength 780 nm is set to $n_j$. The distance between a fourth lens face and the scanned face is set to $d_4$. In this case, the above values are provided as follows.

| i | $R_{ix}$ | $R_{iy}$ | $d_i$ | j | $n_j$ |
|---|---|---|---|---|---|
| 0 |  |  | 141.0 |  |  |
| 1 | −1000 | −1000 | 10 | 1 | 1.9 |
| 2 | −215.8 | −215.8 | 253.4 |  |  |
| 3 | ∞ | 18.9 | 3 | 2 | 1.49 |
| 4 | ∞ | ∞ | 40 |  |  |

Figure 4D:
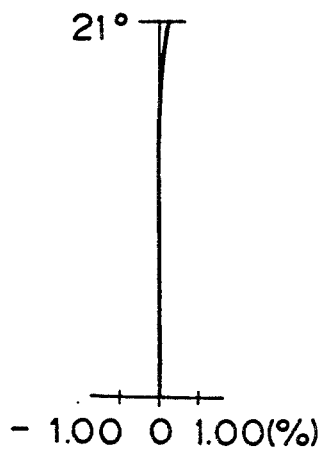

FIG. 4d shows a graph of f$\theta$ characteristics showing that the optical scanning operation is performed at an equal speed.

Figure 5A:
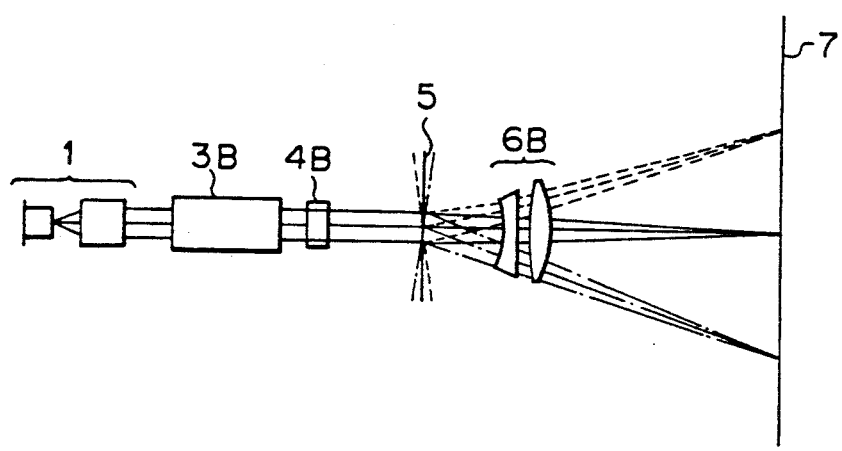
FIGS. 5a to 5c are views for explaining an optical scanner in a fourth embodiment of the present invention.
Figure 5C:
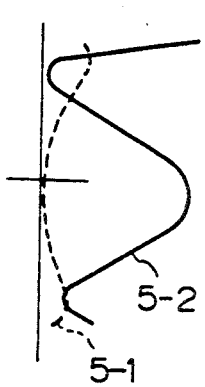
Figure 5B:
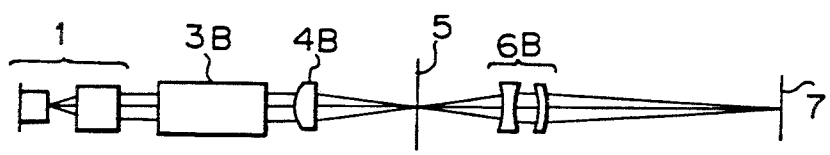

FIGS. 5a to 5c show an optical scanner in a fourth embodiment of the present invention. In these figures, portions similar to those in FIGS. 1a to 1c are designated by the same reference numerals.

FIGS. 5a and 5b are also drawn in accordance with FIGS. 1a and 1b. In these figures, a control means for controlling the operation of an optical element is omitted.

In this embodiment, an approximately parallel light beam polarized in a cross scan-corresponding direction is emitted from a light source device 1.

A first image forming optical system is constructed by an optical element 3B and a cylindrical lens 4B having refracting power only in the cross scan-corresponding direction. As shown in FIG. 5b, the light beam transmitted through the first image forming optical system is formed by the action of this optical system as a linear image extending in a main scan-corresponding direction in the position of a deflection-reflecting face 5.

The light beam reflected on the deflection-reflecting face is incident on an f$\theta$ lens 6B as a second image forming optical system and is formed by the action of this lens 6B as an image spot on a scanned face 7. The f$\theta$ lens 6B constitutes an anamorphic lens system and sets the positions of the deflection-reflecting face and the scanned face in an approximately conjugate relation in geometrical optics with respect to the cross scanning direction, thereby fulfilling a function for correcting a face inclination.

In this optical scanner, in a state in which no voltage is applied to the optical element 3B, field curvature is provided as shown by curve 5-1 in FIG. 5c in the main scanning direction and is provided as shown by curve 5-2 in FIG. 5c in the cross scanning direction.

Since the field curvature in the main scanning direction is relatively small, this field curvature is not necessarily corrected by the operation of the optical element 3b. When it is necessary to correct only the field curvature in the cross scanning direction, this field curvature is corrected by using the optical element of the type explained on the basis of FIGS. 2a and 2b as the optical element 3B. The fθ lens 6b sets the deflection-reflecting face 5 and the scanned face 7 in an approximately conjugate relation in geometrical optics with respect to the cross scanning direction. Accordingly, when the position of the linear image formed by the cylindrical lens 4B is shifted by a distance $\Delta$ on an optical axis, the position of an image formed by the fθ lens 6B with respect to this linear image is shifted by a distance $\beta^2 \Delta$ where $\beta$ designates a lateral magnification of the fθ lens 6B.

Accordingly, it is possible to remove the field curvature in the cross scanning direction when the position of the linear image formed by the change in focal length of the first image forming optical system is changed by the operation of the optical element 3B in accordance with $-W(\theta)/\beta^2$ where $W(\theta)$ designates the field curvature to be corrected in the cross scanning direction. Different from the case shown in FIG. 5c, when only the field curvature in the main scanning direction is corrected, a control operation similar to that in the embodiment shown in FIGS. 4a to 4d is performed by using an optical element which is of the type explained on the basis of FIGS. 2c and 2d and can change the focal position of the optical system in the main scan-corresponding direction as shown in FIGS. 4a to 4d.

Further, the field curvatures in the main and cross scanning directions can be simultaneously corrected when the focal length of the optical system in the main and cross scanning directions are independently controlled in accordance with the field curvatures in the main and cross scanning directions by using the optical element 3B which is constructed by an optical element of the type explained on the basis of FIG. 2e and can independently change the focal length of the optical system in both X and Z directions.

In the embodiments shown in FIGS. 4 and 5, it is also possible to control the operation of the optical element so as to make the diameter of the image spot formed on the scanned face constant instead of the correction of the field curvature. The field curvature and the change in diameter of the formed image spot can be reduced by strict and approximate controls when the field curvature is corrected and the diameter of the formed image spot are uniformed.

An optical scanner in each of fifth to eighth embodiments of the present invention will next be described.

As mentioned above, the strength of an electric field applied to the optical element is of the order of $10^2$ V/mm to realize a required focal distance. Accordingly, the applied voltage is considerably increased as the distance between a pair of electrodes to which the voltage is applied, i.e., the thickness of an electrooptic medium is increased.

Accordingly, it is necessary to reduce the thickness of the electrooptic medium to operate the optical element at a low voltage. In the embodiments shown in FIGS. 1, 3, 4 and 5, it is necessary to reduce the diameter of the light beam from the light source device so as to reduce the thickness of the electrooptic medium. In such a case, it is difficult to reduce the diameter of the image spot formed on the scanned face. This is because the beam waist diameter for providing the above spot diameter is inversely proportional to numerical aperature or NA of the light beam of the formed image.

In the fifth to eighth embodiments of the present invention, the numerical aperture or NA of the light beam is increased by inserting a beam expanding optical system between the optical element and the deflection-reflecting face. Thus, the optical element is operated at a low voltage and the optical scanning operation can be performed by the formed image spot having a very small diameter.

Figure 10:
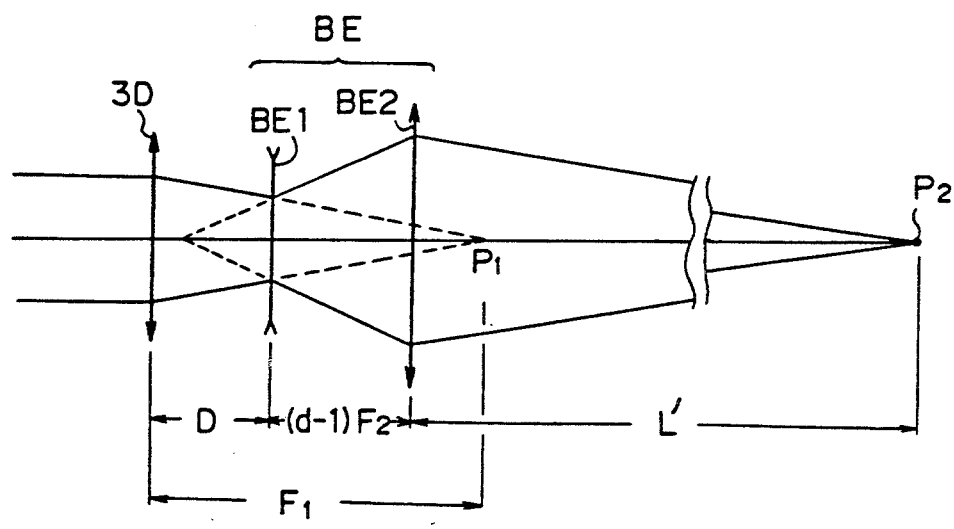
FIG. 10 is a view for explaining features of the present invention in the embodiments shown in FIGS. 6 to 9.

In FIG. 10, an image forming optical system 3D is located between a deflection-reflecting face and a light source device. When the focal length of this image forming optical system is set to $F_1$, a parallel light beam is incident on the image forming optical system and a light beam emitted therefrom is formed as an image at a point $P_1$ separated by the distance $F_1$ from the image forming optical system 3D.

A beam expanding optical system BE is constructed by a negative lens BE1 having a focal length $-F_2$ and a positive lens BE2. When expanding ratio is set to $\alpha$, it is sufficient to set the focal length of the positive lens BE2 to $\alpha F_2$ and the distance between the lenses BE1 and BE2 to $(\alpha-1)F_2$.

At this time, the beam expanding optical system BE forms a real image at a point $P_2$ with the point $P_1$ as a virtual light source. In the nature of the beam expanding optical system, a convergent angle of the light beam incident on the beam expanding optical system BE is equal to that of the light beam emitted from the beam expanding optical system BE and formed as an image.

In FIG. 10, distance $L'$ is provided by $L' = \alpha F_2 + \alpha^2(F_1 - D - F_2)$ and a combined focal length of the beam expanding optical system BE and the image forming optical system 3D is provided as $\alpha F_1$.

Accordingly, the distance between the points $P_1$ and $P_2$ is $L' - (F_1 - D - \{\alpha - 1\}F_2$. Accordingly, when the beam expanding optical system is used, the optical system on the side of the light source device is shifted by the above distance as a whole onto the light source side from the beam expanding optical system in FIGS. 1, 3, 4 and 5. Thus, the situation of the light beam after the deflection-reflecting face is equal to that in each of these figures. Therefore, it is possible to perform the optical scanning operation in the same condition as that in the embodiment shown in each of FIGS. 1, 3, 4 and 5.

When the focal length of the image forming optical system is changed by a distance $\Delta F_1$ by the focal length control performed by the operation of the optical element, the change in position of the formed image point $P_2$ becomes $\alpha^2 \Delta F_1$. Accordingly, the effects of the focal length control are enhanced in accordance with the expanding ratio so that the focal length control of the optical element can be performed in a narrower voltage changing region.

Figure 6:
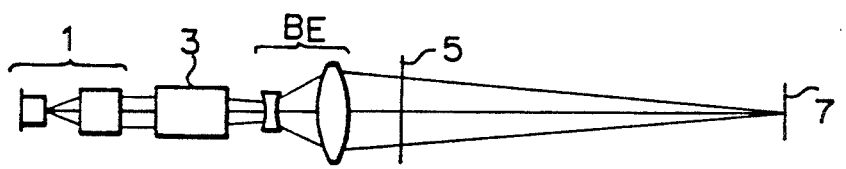
FIG. 6 is a view for explaining an optical scanner in a fifth embodiment of the present invention.

FIG. 6 shows an optical scanner in a fifth embodiment of the present invention using the optical scanner in FIG. 1. A light beam converged from an optical element 3 constituting the image forming optical system is formed as an image spot on a scanned face 7 through a beam expanding optical system BE and a deflection-reflecting face 5.

Figure 7:
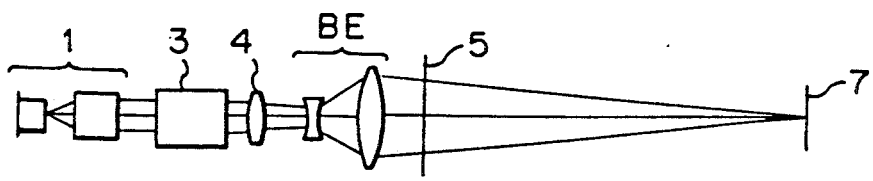
FIG. 7 is a view for explaining an optical scanner in a sixth embodiment of the present invention.

FIG. 7 shows an optical scanner in a sixth embodiment of the present invention using the optical scanner shown in FIG. 3.

A convergent light beam is provided by an image forming optical system constructed by an optical element 3 and a convergent lens 4 and is formed as an image spot on a scanned face 7 through a beam expanding optical system BE and a deflection-reflecting face 5.

In the embodiments shown in FIGS. 6 and 7, the numerical aperture or NA of the light beam is increased by the operation of the beam expanding optical system so that it is possible to reduce the diameter of the formed image spot.

Figure 8A:
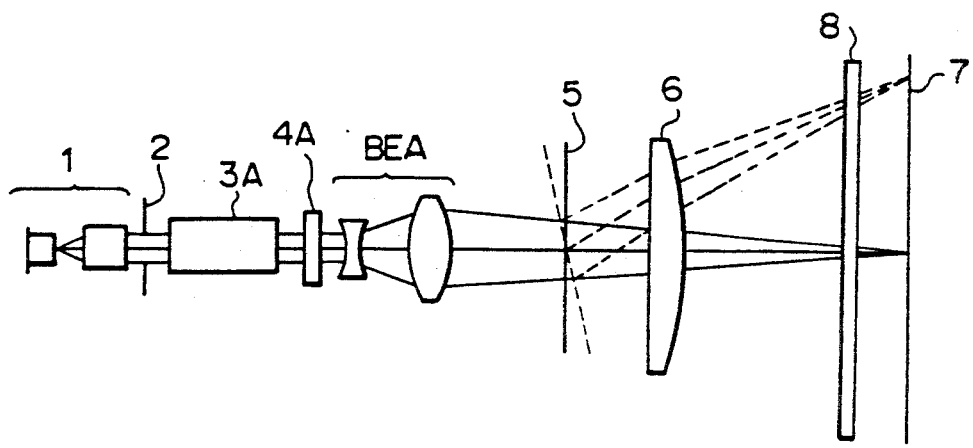
FIGS. 8a to 8c are views for explaining an optical scanner in an seventh embodiment of the present invention.

FIG. 8a shows an optical scanner in a seventh embodiment of the present invention using the optical scanner shown in FIG. 4. In this embodiment, a beam expanding optical system BEA is disposed between a deflection-reflecting face and a first image forming optical system constructed by an optical element 3A and a cylindrical lens 4A so as to increase the numerical aperture or NA of a light beam. This beam expanding optical system BEA is constructed by two cylindrical lenses having refracting power only in a main scan-corresponding direction. This beam expanding optical system BEA has a beam expanding effect only in a main scanning direction and has no beam expanding effect in a cross scan-corresponding direction.

Figure 8B:
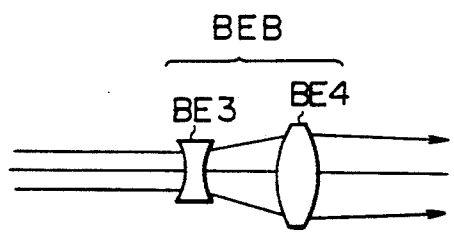
Figure 8C:
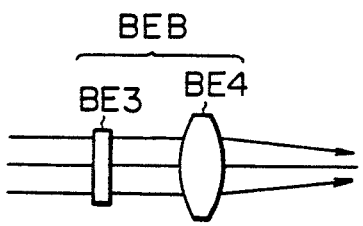

This is because, in an optical system using a cylindrical lens 8 in the vicinity of a scanned face 7, the diameter of a formed image spot in a cross scanning direction can be generally reduced so that it is not necessary to expand the light beam in the cross scanning direction. FIGS. 8b and 8c show modified examples of the optical scanner in the embodiment shown in FIG. 8a.

In these modified examples, a beam expanding optical system BEB is constructed by a cylindrical lens BE3 having refracting power only in a main scan-corresponding direction and a spherical lens BE4. As shown in FIG. 8b, this beam expanding optical system BEB has a beam expanding effect in the main scan-corresponding direction. However, as shown in FIG. 8c, the beam expanding optical system BEB has an effect as a convergent optical system in the cross scan-corresponding direction. Such a beam expanding optical system BEB can be used instead of the cylindrical lens 4A constituting the first image forming optical system in the embodiment shown in FIG. 8a so that it is not necessary to dispose the cylindrical lens 4A.

Figure 9A:
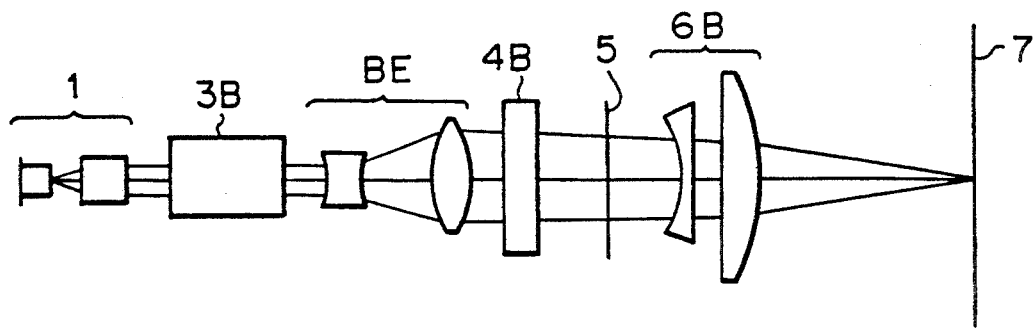
FIGS. 9a to 9d are views for explaining an optical scanner in an eighth embodiment of the present invention.
Figure 9B:
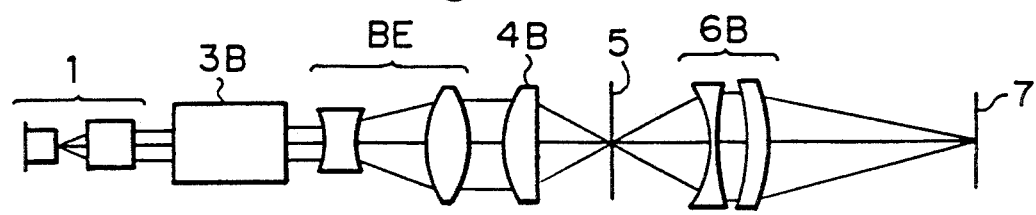

FIGS. 9a and 9b show an optical scanner in an eighth embodiment of the present invention using the optical scanner shown in FIGS. 5a to 5c.

In this embodiment, a beam expanding optical system BE is disposed between an optical element 3B constituting a first image forming optical system and a cylindrical lens 4B. As shown in FIG. 9a, with respect to a main scanning direction, the diameter of a light beam from the optical element 3B is expanded by the beam expanding optical system BE and the expanded light beam is transmitted through the cylindrical lens 4B and is then formed as an image on a scanned face 7 through a deflection-reflecting face 5 and an fθ lens 6B.

With respect to a cross scanning direction, as shown in FIG. 9b, the light beam from the beam expanding optical system is formed by the cylindrical lens 4B as a linear image in the position of the deflection-reflecting face 5. Thereafter, the light beam is diverged and incident on the fθ lens 6B and is formed as an image on the scanned face 7 by the action of the lens 6B.

As shown in this embodiment, when the beam expanding optical system is used between the optical element and the cylindrical lens, the following secondary effects are provided. Namely, when there is no beam expanding optical system, the light beam having a small diameter is incident on the cylindrical lens 4B so that it is necessary to dispose the cylindrical lens near the deflection-reflecting face to a certain extent so as to form this light beam as an image in the position of the deflection-reflecting face 5. Therefore, a condition for arranging the deflecting means is greatly limited by the cylindrical lens. However, when the beam expanding optical system is used, the light beam having an expanded diameter is incident on the cylindrical lens so that the cylindrical lens is arranged away from the deflection-reflecting face and a linear image can be formed in the position of the deflection-reflecting face.

Figure 9C:
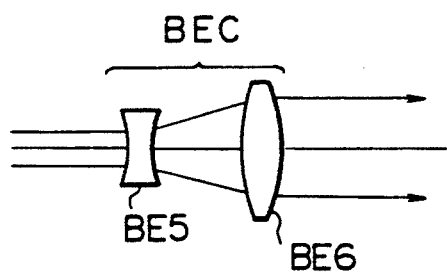
Figure 9D:
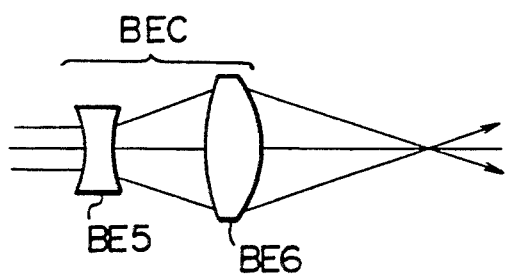

FIGS. 9c and 9d show a modified example of the optical scanner in the embodiment shown in FIGS. 9a and 9b.

In this modified example, a beam expanding optical system BEC is constructed by a cylindrical lens BE5 and an anamorphic lens BE6 having a toric face on an image side thereof. This beam expanding optical system BEC has a beam expanding effect in a main scan-corresponding direction as shown in FIG. 9c. However, the beam expanding optical system BEC has an effect as a convergent optical system in a cross scan-corresponding direction as shown in FIG. 9d. Such a beam expanding optical system BEC can be used instead of the cylindrical lens 4B constituting the first image forming optical system in the embodiment shown in FIGS. 9a and 9b so that it is not necessary to dispose the cylindrical lens 4B.

It is also possible to effectively reduce the formed image spot in the embodiments shown in FIGS. 8 and 9.

In the above-mentioned embodiments, the light source device is constructed by the combination of the semiconductor laser LD and the collimator lens CL which are separated from each other.

The thickness of the optical element in the applied direction of the electric field perpendicular to a light transmitting direction is about 1 mm. Therefore, it is necessary to set the diameter of the light beam from the semiconductor laser to about 1 mm and make this light beam incident to the optical element. In this case, the effective numerical aperture or NA of the collimator lens is rapidly reduced as the focal length of the collimator lens is increased.

In the normal collimator lens, it is necessary to set its numerical aperture or NA to a value equal to or greater than 0.15 in view of light utilization efficiency. The focal length of the collimator lens satisfying this condition is less than 3.33 mm.

The semiconductor laser is generally disposed within a casing for prevention of dust and airtightness to increase life thereof. When the focal length of the collimator lens is less than 4 mm, a light-emitting portion of the semiconductor laser cannot be arranged by this casing in the vicinity of the focal point position of the collimator lens.

To solve this problem, a microlens is used as the collimator lens and is disposed within the casing together with the semiconductor laser. In such a structure, it is possible to provide a compact light source device having an improved light utilization efficiency. Two examples of such a light source device will next be explained.

Figure 11A:
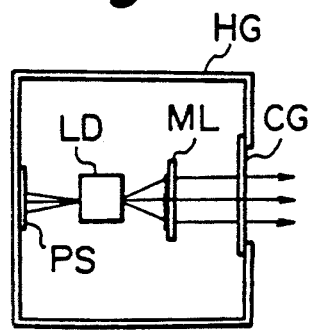
FIGS. 11a and 11b are views showing two examples of a light source device.

In FIG. 11a, a microlens ML is disposed within a casing HG in front of a semiconductor laser LD disposed within the casing HG. The microlens ML changes a divergent light beam from the semiconductor laser LD to a parallel light beam. This parallel light beam is emitted to the exterior of the casing HG from a window CG disposed therein. A light-receiving element PS for a monitor receives a light beam emitted from a rear portion of the semiconductor laser LD.

Figure 11B:
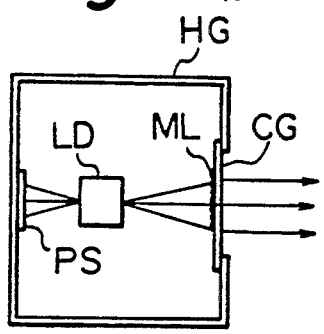

FIG. 11b shows an example in which the microlens ML is directly formed in the window CG. In these examples, the microlens is composed of a microfresnel lens, but may be formed by a microlens for the normal collimator. Such a semiconductor laser light source device is already shown in Japanese Patent Application Laying Open (KOKAI) No. 63-314516.

As mentioned above, in accordance with the construction of a novel optical scanner in the present invention, it is possible to preferably perform an optical scanning operation with reduced change in diameter of a formed image spot.

In addition to this effect, it is possible to correct the above-mentioned face inclination in the deflecting means. Further, it is possible to perform an optical scanning operation of high density by sufficiently reducing the diameter of the formed image spot.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
    a light source device for emitting an approximately parallel light beam polarized approximately linearly;
    deflecting means for deflecting said emitted light beam from said light source device toward a scanned face;
    an image forming optical system including an optical element having a focal length variable by an electrooptic medium, said image forming optical system being arranged between said light source device and said deflecting means to form said emitted light beam from said light source device as an image in a shape of a spot on said scanned face;
    control means for controlling said focal length of said image forming optical system; and
    a beam expanding optical system arranged between said image forming optical system and said deflecting means for expanding said emitted light beam to be formed as said image on said scanned face,
    said optical element comprising an electrode pair disposed in said electrooptic medium of said optical element, the arrangement position and shape of the respective electrodes being constructed such that a convergent position of said emitted light beam can be changed when a voltage is applied by said control means between said electrodes,
    said control means controlling said focal length of said image forming optical system such that field curvature is removed in synchronization with an optical scanning operation, or a diameter of said formed image spot is approximately constant irrespective of an optical scanning position.

2. An optical scanner according to claim 1, which further comprises a convergent lens disposed between said image forming optical system and said beam expanding optical system.

3. An optical scanner comprising:
    a light source device for emitting an approximately parallel light beam polarized approximately linearly;
    deflecting means for deflecting said emitted light beam from said light source device toward a scanned face;
    a first image forming optical system including an optical element having a focal length variable by an electrooptic medium, and arranged between said light source device and said deflecting means;
    a second image forming optical system arranged between said deflecting means and said scanned face for forming said deflected light beam as an image on said scanned face;
    a beam expanding optical system arranged between said first image forming optical system and said deflecting means for expanding said emitted light beam to be formed as said image on said scanned face; and
    control means for controlling said focal length of said first image forming optical system;
    said optical element comprising an electrode pair disposed in said electrooptic medium of said optical element, the arrangement position and shape of the respective electrodes being constructed such that a focal position of said emitted light beam in at least one of two directions perpendicular to each other can be changed when a voltage is applied by said control means between said electrodes,
    said control means controlling said focal length of said first image forming optical system such that field curvature in a main-scanning direction and/or a cross-scanning direction is removed in synchronization with an optical scanning operation, or a diameter of said formed image spot is approximately constant irrespective of an optical scanning position.

4. An optical scanner comprising:
    a light source device for emitting an approximately parallel light beam polarized approximately linearly;
    deflecting means for deflecting said emitted light beam from said light source device toward a scanned face;
    a first image forming optical system including an optical element having a focal length variable by an electrooptic medium having a parallelepiped shape, and a lens having refracting power only in a cross-scanning direction, said optical element being arranged between said light source device and said deflecting means, said lens being arranged between said optical element and said deflecting means;
    a second image forming optical system arranged between said deflecting means and said scanned face for forming said deflected light beam as an image on said scanned face; and control means for controlling said focal length of said first image forming optical system, said optical element including a pair of electrodes disposed respectively on two opposite surfaces of said electro-optic medium in such a manner as to be opposite to each other, each of said electrodes having a shape of a longitudinal strip extending along an optical axis of said emitted light beam, said two opposite surfaces extending along said optical axis, one of said electrodes being electrically connected to one of terminals of an electric power source, the other of said electrodes being electrically connected to the other of said terminals, said optical element being so arranged as to be capable of changing a focal position of said emitted light beam in said cross-scanning direction when a voltage is applied by said control means between said electrodes, said control means controlling said focal length of said optical element such that field curvature in said cross-scanning direction is removed in synchronization with an optical scanning operation, or a diameter of said formed image spot is approximately constant irrespective of an optical scanning position.

5. An optical scanner according to claim 4, in which a beam expanding optical system is arranged between said optical element and said lens so as to expand said emitted light beam to be formed as said image on said scanned face.

6. An optical scanner according to claim 5, in which said beam expanding optical system comprises a cylindrical lens and an anamorphic lens which has a toric face on an image side thereof.

7. An optical scanner comprising:

a light source device for emitting an approximately parallel light beam polarized approximately linearly;

deflecting means for deflecting said emitted light beam from said light source device toward a scanned face;

a first image forming optical system including an optical element having a focal length variable by an electrooptic medium having a parallelepiped shape, and a lens having refracting power only in a cross-scanning direction, said optical element being arranged between said light source device and said deflecting means, said lens being arranged between said optical element and said deflecting means;

a second image forming optical system arranged between said deflecting means and said scanned face for forming said deflected light beam as an image on said scanned face; and control means for controlling said focal length of said first image forming optical system, said optical element including a pair of first electrodes and a pair of second electrodes, said first electrodes being disposed respectively on two opposite surfaces of said electrooptic medium on one side with respect to a direction perpendicular to an optical axis of said emitted light beam in such a way that said first electrodes are opposite to each other, each of said first electrodes having a shape of a longitudinal strip extending along said optical axis, said two opposite surfaces extending along said optical axis, said second electrodes being disposed respectively on said two opposite surfaces on the other side with respect to said direction perpendicular to said optical axis in such a way that said second electrodes are opposite to each other, each of said second electrodes having a shape of a longitudinal strip extending along said optical axis, one of said first electrodes disposed on one of said two opposite surfaces and one of said second electrodes disposed on said one of said two opposite surfaces being electrically connected to one of terminals of an electric power source, the other of said first electrodes disposed on the other of said two opposite surfaces and the other of said second electrodes disposed on the other of said two opposite surfaces being electrically connected to the other of terminals of said electric power source, said optical element being so arranged as to be capable of changing a focal position of said emitted light beam in a main-scanning direction when a voltage is applied by said control means between said first and second electrodes disposed on said one of said two opposite surfaces and said first and second electrodes disposed on said other of said two opposite surfaces, said control means controlling said focal length of said optical element such that field curvature in said main-scanning direction is removed in synchronization with an optical scanning operation, or a diameter of said formed image spot is approximately constant irrespective of an optical scanning position.

8. An optical scanner according to claim 7, in which a beam expanding optical system is arranged between said lens and said deflecting means so as to expand said emitted light beam to be formed as said image on said scanned face.

9. An optical scanner according to claim 8, in which said beam expanding optical system comprises a cylindrical lens having refracting power only in said main-scanning direction, and a spherical lens.

* * * * *